United States Patent [19]

Ukawa et al.

[11] Patent Number: 5,132,027

[45] Date of Patent: Jul. 21, 1992

[54] METHOD AND APPARATUS FOR TREATING ABSORBENT SOLUTION SLURRY CONTAINING FLY ASH

[75] Inventors: Naohiko Ukawa; Susumu Okino; Toru Takashina, all of Hiroshima; Masakazu Onizuka, Kanonshin, all of Japan

[73] Assignee: Mitsubishi Jukogyo Kabushiki Kaisha, Tokyo, Japan

[21] Appl. No.: 618,251

[22] Filed: Nov. 21, 1990

[30] Foreign Application Priority Data

Feb. 14, 1990 [JP] Japan .................................... 2-31496

[51] Int. Cl.⁵ ........................ B01D 21/26; C01B 17/00
[52] U.S. Cl. ................................. 210/787; 210/749; 210/765; 210/512.1; 423/242; 423/244; 423/555
[58] Field of Search .............. 423/242 A, 244, 555; 210/743, 749, 758, 765, 787, 739, 380.1, 767, 382, 512.1

[56] References Cited

U.S. PATENT DOCUMENTS

| | | | |
|---|---|---|---|
| 4,614,545 | 9/1986 | Yoneda et al. | 423/242 A |
| 4,632,810 | 12/1986 | Shinodo et al. | 423/242 A |
| 4,687,648 | 8/1987 | Biolchini et al. | 423/242 A |
| 4,687,649 | 8/1987 | Kuroda et al. | 423/555 |
| 4,740,362 | 4/1988 | Claerbout et al. | 423/242 A |

Primary Examiner—Robert A. Dawson
Assistant Examiner—David Reifsnyder
Attorney, Agent, or Firm—Fleit, Jacobson, Cohn, Price, Holman & Stern

[57] ABSTRACT

In a wet lime desulfurization of exhaust gases containing $SO_2$ and fly ash, a method and apparatus for treating absorbent solution slurry-containing fly ash includes diverting at least a part of the absorbent solution slurry containing fly ash particles, separating the diverted absorbent solution slurry by centrifugal separation into the solid gypsum component and a liquid component of a suspension containing fine fly ash particles, adjusting the pH value of the suspension containing fine fly ash particles remaining in a filtrate to 6 to 9 by adding an alkali, supplying the pH adjusted suspension to a thickener, removing concentrated sludge from the thickener, passing overflow $H_2O$ from the thickener to a limestone slurry tank, and passing slurry from the limestone slurry tank to the absorbent solution slurry as make-up feed. Ill effects caused by fly ash and HF in exhaust gases are avoided, the activity of $CaCo_3$ in the absorbent slurry is maintained, and highly pure gypsum is recovered.

6 Claims, 1 Drawing Sheet

METHOD AND APPARATUS FOR TREATING ABSORBENT SOLUTION SLURRY CONTAINING FLY ASH

BACKGROUND OF THE INVENTION

The present invention relates to a method and an apparatus for treating absorption slurry containing fly ash. More specifically, it relates to a method and an apparatus for separating fly ash which is present in an absorbent slurry out of a desulfurization apparatus for exhaust gases by a wet lime method.

When an exhaust gas from coal burning is desulfurized according to a wet lime method, an absorbent solution absorbs $SO_x$ present in the exhaust gas. Also, an exhaust gas often includes HF as a harmful component. When such exhaust gas is treated with $CaCO_3$ as an $SO_2$ absorbent in a wet type exhaust gas absorption tower, the following reactions occur:

$$CaCO_3 + SO_2 \rightarrow CaSO_3 + CO_2, \quad (1)$$

$$CaCO_3 + 2HF \rightarrow CaF_2 + CO_2 - H_2O. \quad (2)$$

However, the exhaust gas contains fly ash as well as $SO_x$ and HF, and this fly ash also mixes into the absorbent solution. If the absorbent solution, as a result, contains a large amount of fly ash, the aluminum (Al) component in the fly ash dissolves and produces fluorine compounds of aluminum (called $AlF_x$ hereinafter) by reacting with HF present in the gas. The $AlF_x$ thus produced is known to inhibit the dissolution effect of limestone ($CaCO_3$) (Japanese Patent Provisional Publication No. 16702/1970 (or Showa55-16702)).

To cope with this, it is effective to prevent fly ash, a source of aluminum, from mixing into the absorbent solution. It is thus common to dispose a dust separator, such as an electrostatic precipitator, in an upstream position from the exhaust gas desulfurization apparatus. However, it is difficult to remove fly ash completely, and the mixing of fly ash into the absorbent solution is unavoidable in reality.

Also, the fly ash which mixes into the absorbent solution is fine particles whose average diameter is 5 μm or less, and since the speed of precipitation is slow, removal by precipitation separation requires a thickener with an extremely large sectional area. The separation is difficult with a thickener only.

Furthermore, if the absorbent solution contains a large amount of fly ash, it has been a disadvantageous problem that collected gypsum will also contain fly ash and the recovery of highly pure gypsum is impossible.

BRIEF SUMMARY OF THE INVENTION

It is an object of the present invention to solve the above-mentioned problems and provide a method and an apparatus for treating an absorbent solution slurry containing fly ash which avoids ill effects caused by fly ash and HF in exhaust gases, maintains the activity of $CaCO_3$, and collects gypsum with high purity.

In the wet lime desulfurization of exhaust gases, the present invention is in a method for treating absorbent solution slurry containing fly ash which is characterized by the steps of diverting a part of an absorbent solution slurry containing fly ash particles; after its solid and liquid components are separated by centrifugal separation, adjusting the pH value of a suspension containing fine fly ash particles remaining in the filtrate to 6 to 9 by adding an alkali to it; then supplying the suspension to a thickener; collecting an overflow water from the thickener as a clarified solution and supplying back to the absorbent tower as a make-up feed; and at the same time, discharging an underflow solution from the thickener out of the system as concentrated sludge. Also, the present invention concerns itself with an apparatus for carrying out the above method.

According to the present invention, the absorbent solution slurry coming out of an absorption tower and containing fly ash particles is first supplied to a centrifugal separator and separated between solid and liquid. In this case, the absorbent solution slurry is mostly, 20 wt % for example, gypsum and contains small amounts of fly ash, less than 1 wt % for example. A centrifugal separator can easily separate particles with larger specific density and with greater grain size because of its operating principle. Therefore, while it can separate gypsum with larger grain size and specific density completely, a centrifugal separator cannot completely remove fly ash with smaller grain size and specific density, leaving some residue of fly ash in the solution. For example, while gypsum can be separated 90% or more, only 20% or less of fly ash can be separated. Therefore, further procedures are required to remove fine particles of fly ash remaining in the filtrate. In removing fine particles by sedimentation from a suspension containing such particles, while thickeners are widely used, the speed of sedimentation becomes a problem. The speed of sedimentation of fine particles whose average diameter is 5 μm or less, such as fly ash, is extremely slow as it is, and a thickener with a very large sectional area is required.

Thus the present inventors have carried out an extensive study and found that if an alkali, such as $Ca(OH)_2$ and NaOH, is added to the suspension containing fly ash and coming out of the centrifugal separator to adjust its pH to a value between 6 and 9, the speed of sedimentation increases significantly, and therefore a small thickener can perform the separation. This is considered to be caused by some change in the zeta-potential due to an electric double layer formed on the surface of fly ash particles depending on pH values. Particles which do not cohere on the acidic side because of electric repulsive forces between them do cohere when the solution is neutral or alkaline because the repulsive forces disappear, and their sedimentation is accelerated because of this cohesion.

Because the pH of an absorbent solution slurry in normal operation is between 4 and 6, i.e. in a weakly acidic region, only a small amount of an alkali is necessary for adjusting the pH as described above, and this is very advantageous in putting the method of the present invention into practice.

The overflow water from the thickener, which has been treated as described above, is collected as a clarified solution which contains almost no fly ash particles and supplied again to the absorption tower as a make-up feed. The underflow solution from the thickener is discharged from the system as concentrated sludge, so that the concentration of fly ash in the absorbent solution slurry is maintained to be less than a certain value.

Also, because the separation ratio of fly ash particles is smaller than that of gypsum with the centrifugal separator mentioned above, the collected gypsum is highly pure and contains only a small amount of fly ash mixed in.

BRIEF DESCRIPTION OF THE FIGURE

The invention will now be described in detail with reference to the accompanying FIGURE, wherein.

DETAILED DESCRIPTION

Figure 1:
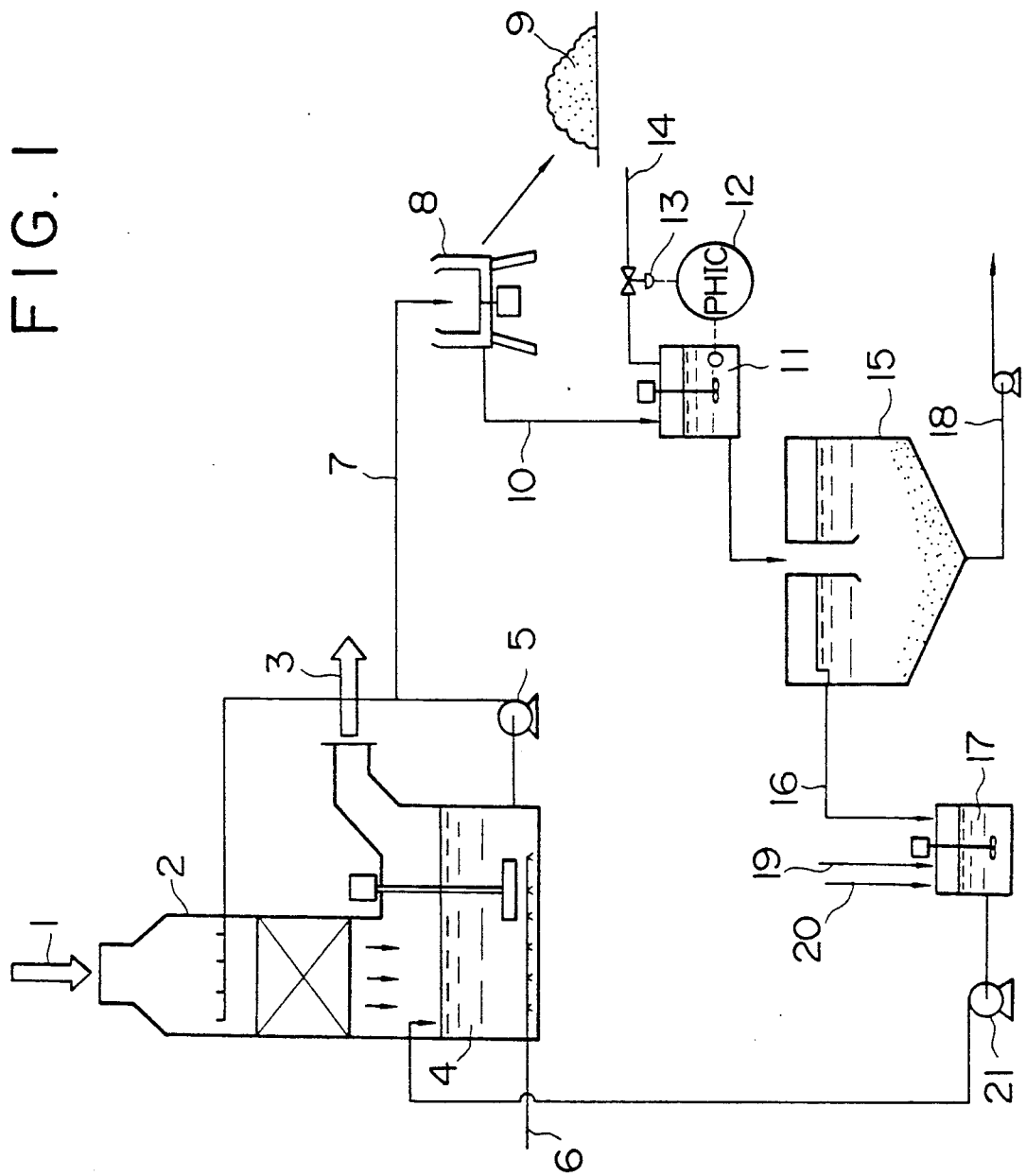
FIG. 1 shows a flow chart of an embodiment of the present invention.

In FIG. 1, numeral 1 indicates a supply line for exhaust gas to be treated, 2 an absorption tower, 3 a discharge line, 4 a slurry tank, 5 an absorbent solution pump, 6 a supply line for oxidizing air, 7 a line for supplying the absorbent solution to a centrifugal separator, 8 a centrifugal separator, 9 separated gypsum, 10 a supply line for the suspension, 11 a pH-adjusting tank, 12 pH control meter, 13 a control valve, 14 a supply line for an alkali, 15 a thickener, 16 an overflow water line, 17 a tank for preparing limestone slurry, 18 an underflow line, 19 line for supplying limestone powder, 20 a line for supplying make-up feed, and 21 a pump for supplying limestone slurry.

With reference to FIG. 1, we shall describe an embodiment of the present invention.

A part of an exhaust gas diverted from a small pulverized coal firing equipment (not shown) was treated according to the embodiment of the present invention shown in FIG. 1 at a rate of 200 m$^3$N/h.

The entrance temperature of an exhaust gas to be treated was adjusted to 110° C. by a heat exchanger (not shown), and the concentration of fly ash was adjusted to about 200 mg/m$^3$N by a bag filter (not shown). The entrance concentration of SO$_2$ was 3000 ppm, and the concentration of HF 40 ppm.

According to this embodiment, the gas to be treated is introduced into an absorption tower 2 through line 1. After SO$_2$, HF and fly ash are removed from it, the gas is discharged from line 3. A slurry tank 4 is disposed under the absorption tower 2 to hold an absorbent solution slurry, and air is supplied to the bottom of the tank through line 6 for oxidation of CaSO$_3$ to produce gypsum according to the following reaction: CaSO$_3$+½O$_2$+H$_2$O→CaSO$_4$·2 H$_2$O. Thus the main component of solids in the absorption slurry becomes calcium sulfate (gypsum). The absorbent solution slurry is circulated to the top portion of the absorption tower 2 from the slurry tank 4 by way of an absorbent solution pump 5.

A part of the absorbent solution slurry is diverted through line 7 and supplied to a centrifugal separator 8. The centrifugal separator 8 separates highly pure gypsum 9, and a suspension containing fine particle fly ash is supplied to a tank 11 for adjusting pH through line 10. The pH of the suspension in the pH-adjusting tank 11 is adjusted to a prescribed range between 6 and 9 by changing the amount of alkalis supplied via line 14 and by controlling this amount by varying the opening of a control valve 13 via a pH control meter 12.

After the pH is adjusted, the suspension is supplied to a thickener 15, and the overflow water is sent to a tank 17 for preparing limestone slurry via line 16. The underflow solution from the thickener 15 is discharged out of the system through line 18 as concentrated sludge.

A powder of limestone is supplied to the limestone slurry preparation tank 17 through line 19. After a limestone slurry of a given concentration is prepared, it is supplied to a slurry tank 4 at a constant rate by way of a limestone slurry supply pump 21. Also, a make-up feed, as well as the overflow water from the thickener, is supplied to the limestone slurry preparation tank 17 from the outside of the system via line 20.

Under conditions described above, a stable operation was carried out. The concentration of SO$_2$ in the outlet gas was 120 ppm with the stable operation, and the pH of the absorbent solution slurry in the slurry tank 4 was 5.6. The pH of the suspension in the pH-adjusting tank 11 was controlled to 7.0. Also, the concentration of CaCO$_3$ in the absorbent solution turned out to be 0.05 mol/l, and the reactivity of CaCO$_3$ was good.

The concentrations of aluminum (Al) and fluorine (F) in the filtered absorbent solution were measured to be 1.0 mg/l and 17 mg/l, respectively, and small. Also, the purity of the gypsum thus obtained was 96% or more and its color was white.

COMPARATIVE EXAMPLE

Using the same apparatus and gas conditions as the above embodiment, another stable operation was carried out with the supply of an alkali from line 14 stopped and without controlling the pH in the pH-adjusting tank 11.

In this comparative example, the pH of the absorbent solution slurry in the slurry tank 4 gradually decreased after the starting of the operation and finally reached 4.5. While the CaCO$_3$ concentration remained unchanged at 0.05 mol/l simply because it was controlled to be the same as in the above embodiment, the reactivity of CaCO$_3$ was greatly reduced compared to the above embodiment due to the decrease of the pH value. Also, the SO$_2$ concentration in the outlet gas was 250 ppm, and the desulfurization efficiency became degraded.

The concentrations of aluminum (Al) and fluorine (F) in the filtered absorbent solution were 72 mg/l and 125 mg/l, respectively. Also, the color of the gypsum thus obtained was grey due to the mixing of fly ash.

We have described in detail the method and the apparatus of the present invention for separating fly ash in the absorbent solution in a wet lime desulfurization method for exhaust gases by way of the embodiments. It should be noted that the present invention can also be applied to the case in which fly ash in a suspension has to be precipitated and removed in an ordinary water treatment apparatus.

It should also be noted that, while it shows a preferred form, the above embodiment by no means restricts the scope of the present invention as set forth in the appended claims. All variations and modification which come within the meaning of the claims are intended to be embraced therein.

As we have described above, according to the present invention, ill effects caused by fly ash and HF in exhaust gases can be avoided, and the activity of CaCO$_3$ may be maintained, and highly pure gypsum can be collected.

We claim:

1. In wet lime desulfurization of exhaust gases containing fly ash, a method for treating absorbent solution slurry containing fly ash in a slurry tank in an absorption tower comprising:

diverting at least a part of an absorbent solution slurry containing fly ash particles from the absorption tower;

separating solid and liquid components of the diverted absorbent solution slurry by centrifugal separation so that said liquid component comprises a suspension containing fine fly ash particles;

adjusting the pH value of said suspension containing fine fly ash particles to a value of substantially 6 to 9 by adding an alkali thereto;

feeding said suspension to a thickener to produce a concentrated sludge;

collecting overflow water from the thickener as a clarified solution;

feeding said overflow water to said absorption tower as a make-up feed; and discharging said concentrated sludge out of the process as an underflow solution from the thickener.

2. The method as claimed in claim 1 and further comprising;

feeding said overflow water from the thickener to an absorbent slurry solution preparation tank;

preparing an absorbent slurry solution; and feeding said absorbent slurry solution to the absorption tower as said make-up feed.

3. The method as claimed in claim 1 wherein said alkali is selected from the group consisting of $Ca(OH)_2$ and NaOH.

4. The method as claimed in claim 2 wherein said alkali is selected from the group consisting of $Ca(OH)_2$ and NaOH.

5. An apparatus for wet lime desulfurization of exhaust gases containing fly ash comprising:

an absorption tower means for receiving and treating exhaust gases with an absorbent solution;

circulation means for circulating said absorbent solution in said absorption tower means;

means for diverting part of said absorbent solution from said circulation means;

centrifugal separator means for separating gypsum as a solid component of said diverted part of said absorbent solution from a liquid component of said solution comprising a suspension containing fine fly ash particles;

means for feeding said diverted part of said absorbent solution from said diverting means to said centrifugal separator means;

pH adjusting tank means for adjusting pH of said suspension to a value between substantially 6 and 9;

means for feeding an alkali to said pH adjusting tank means;

means for feeding said suspension from said separator to said pH adjusting tank means;

thickener means for treating said suspension from said pH adjusting tank means to produce a concentrated sludge; and means for feeding said suspension from said pH adjusting tank means to said thickener means.

6. The apparatus as claimed in claim 5 and further comprising:

limestone solution slurry preparation tank means;

means for feeding overflow water from said thickener means to said limestone solution slurry preparation tank means; and means for feeding limestone solution slurry from said slurry preparation tank means to said absorption tower means as make up feed.

* * * * *